United States Patent [19]
Harmer et al.

[11] Patent Number: 6,133,493
[45] Date of Patent: Oct. 17, 2000

[54] PERFLUORINATED ION-EXCHANGE MICROCOMPOSITE CATALYSTS MODIFIED WITH LEWIS ACID

[75] Inventors: Mark Andrew Harmer; Qun Sun, both of Wilmington, Del.

[73] Assignee: E. I. du Pont de Nemours and Company, Wilmington, Del.

[21] Appl. No.: 09/306,277

[22] Filed: May 6, 1999

Related U.S. Application Data

[62] Division of application No. 09/070,041, Apr. 30, 1998, Pat. No. 5,932,511.
[60] Provisional application No. 60/047,969, May 28, 1997.
[51] Int. Cl.[7] .............................. C07C 2/66; C07C 2/70
[52] U.S. Cl. ...................... 585/462; 585/457; 585/458
[58] Field of Search ................................ 585/457, 458, 585/462

[56] References Cited

U.S. PATENT DOCUMENTS

| | | | |
|---|---|---|---|
| 4,038,213 | 7/1977 | McClure et al. | 252/430 |
| 5,430,122 | 7/1995 | Drysdale | 528/55 |
| 5,541,346 | 7/1996 | Drysdale et al. | 549/509 |
| 5,561,095 | 10/1996 | Chen et al. | 502/169 |
| 5,932,511 | 8/1999 | Harmer et al. | 502/159 |

FOREIGN PATENT DOCUMENTS

| | | |
|---|---|---|
| WO 95/19222 | 7/1995 | WIPO . |
| WO 96/19288 | 6/1996 | WIPO . |
| WO 97/35662 | 10/1997 | WIPO ............................... B01J 31/10 |

OTHER PUBLICATIONS

Olah et al., Perfluorinated Resinsulfonic Acid (Nafion–H(R)) Catalysis in Synthesis, *Synthesis*, 513–531, Jul. 1986.
F. J. Waller, Catalysis with Metal Cation–Exchanged Resins, *Catal. Ev.–Sci. Eng.*, 28(1), 1–12, 1986.
Mauritz et al., Perfluorinated–Ionomer–Membrane–Based Microcomposites, *American Chemical Society*, 401–417, 1989.
R. S. Drago et al., Preparation and Catalytic Activity of a New Solid Acid Catalyst, *J. Am. Chem. Soc.*, 110, 3311–3312, 1988.
Kobayashi et al., A Polymer–Supported Scandium Catalyst, *J. Org. Chem.*, 61, 2256–2257, 1996.
Schmeisser et al., Chemistry of Perfluoroalkanesulfonic Acids, *Chem Ber*, 103, 868–79, 1970.
Mikami et al., Metal Bis(trifluoromethylsulfonyl)amides as Highly Efficient Lewis Acid Catalysts for Acylation Reactions, *Synlett*, 171–172, Feb. 1996.

*Primary Examiner*—Marian C. Knode
*Assistant Examiner*—Thuan D. Dang

[57] ABSTRACT

This invention concerns a modified porous microcomposite comprising a perfluorinated ion-exchange polymer entrapped within and highly dispersed throughout a network of inorganic oxide wherein the network and optionally the pendant groups of the polymer have been modified with a Lewis acid. These modified microcomposites can be used in catalyst compositions for various chemical processes, such as in the alkylation or acylation of aromatics.

3 Claims, No Drawings

PERFLUORINATED ION-EXCHANGE MICROCOMPOSITE CATALYSTS MODIFIED WITH LEWIS ACID

This is a division of application Ser. No. 09/070,041 filed Apr. 30, 1998 now U.S. Pat. No. 5,932,511 which claims priority benefit of Provisional Application No. 60/047,969, filed May 28, 1997.

FIELD OF THE INVENTION

This invention concerns catalysts comprising chemically modified perfluorinated ion-exchange microcomposites, processes for their preparation and their use as catalysts in chemical processes.

TECHNICAL BACKGROUND

K. A. Mauritz et al., Polym. Mater. Sci. Eng. 58, 1079–1082 (1988), in an article titled "Nafion-based Microcomposites: Silicon Oxide-filled Membranes", discuss the formation of micro composite membranes by the growth of silicon oxide microclusters or continuous silicon oxide interpenetrating networks in pre-swollen "NAFION®" sulfonic acid films. NAFION® is a registered trademark of E. I. du Pont de Nemours and Company.

U.S. Pat. No. 4,038,213 discloses the preparation of catalysts comprising perfluorinated ion-exchange polymers containing pendant sulfonic acid groups on a variety of supports.

The catalyst utility of perfluorinated ion-exchange polymers containing pendant sulfonic acid groups, supported and unsupported has been broadly reviewed: G. A. Olah et al., Synthesis, 513–531 (1986) and F. J. Waller, Catal. Rev.-Sci. Eng., 1–12 (1986).

WO 95/19222 describes a porous microcomposite comprising a perfluorinated ion-exchange microcomposite containing pendant sulfonic acid and/or carboxylic acid groups entrapped within and highly dispersed throughout a network of metal oxide. These catalysts are differentiated from NAFION® supported catalysts in that by virtue of the preparation of the microcomposite catalyst, the polymer becomes intimately mixed with a metal oxide precursor in solution, and thus becomes thoroughly entrapped and highly dispersed throughout a resulting network of metal oxide. With the polymer being mechanically entrapped within the metal oxide network and not merely on the surface of a support, as is the case in supported catalysts, the catalytic activity of these microcomposite catalysts is significantly increased.

R. S. Drago et al., in "Preparation and Catalytic Activity of a New Solid Acid Catalyst", J. Am. Chem. Soc. 110, 3311–3312, 1988 describe the preparation of a catalyst prepared by reacting an inorganic oxide with aluminum chloride in refluxing carbon tetrachloride. Results suggested that over 90% of the chloroaluminum species on the support had the composition (—O—)$AlCl_2$.

Although a variety of reactions can be beneficially catalyzed by the compounds and the composites cited above, there is still a need for catalysts of increased activity and selectivity and useful in a broad range of applications.

SUMMARY OF THE INVENTION

The present invention provides a modified porous microcomposite, comprising: a perfluorinated ion-exchange polymer containing pendant groups selected from the group consisting of: sulfonic acid groups, metal sulfonate groups, alkyl metal sulfonate groups, metal halide sulfonate groups, alkyl metal halide sulfonate groups, sulfonic acid/Lewis acid complex groups, and any combination of said groups, wherein the polymer is entrapped within and highly dispersed throughout a network of inorganic oxide, said network having a plurality of metal oxy species bonded thereto, said metal oxy species being selected from the group consisting of: a metal oxy halide, an alkyl metal oxy halide, and an alkyl metal oxy.

The present invention also provides a process for the preparation of a modified porous microcomposite, comprising the steps of: contacting a porous microcomposite comprising a perfluorinated ion-exchange polymer containing pendant sulfonic acid groups, wherein said polymer is entrapped within and highly dispersed throughout a network of inorganic oxide, with a Lewis acid for a time sufficient to convert a plurality of hydroxyl groups of the inorganic oxide network to a metal oxy species selected from the group consisting of: a metal oxy halide, an alkyl metal oxy halide, and an alkyl metal oxy.

The present invention also provides a process for the preparation of a modified porous microcomposite, comprising the steps of: contacting a metal oxide with an aqueous solution comprising a perfluorinated ion-exchange polymer containing pendant sulfonic acid groups to form a polymer/metal ion solution; adding to the polymer/metal ion solution a hydrolyzed inorganic oxide; allowing network formation of the inorganic oxide to occur; and recovering a modified porous microcomposite comprising a perfluorinated ion-exchange polymer containing pendant groups selected form the group consisting of: sulfonic acid groups, metal sulfonate groups, alkyl metal sulfonate groups, metal halide sulfonate groups, alkyl metal halide sulfonate groups, sulfonic acid/Lewis acid complex groups, and any combination of said groups, wherein the polymer is entrapped within and highly dispersed throughout the network of inorganic oxide, said network having a plurality of metal oxy species bonded thereto.

The present invention further provides an improved method for alkylating an aromatic compound, the improvement comprising using an effective amount of a catalyst composition comprising a modified porous microcomposite comprising a perfluorinated ion-exchange polymer containing pendant groups selected from the group consisting of: Sulfonic acid groups, metal sulfonate groups, alkyl metal sullonate groups, metal halide sulfonate groups, alkyl metal halide sulfonate groups, sulfonic acid/Lewis acid complex groups, and any combination of said groups, wherein the polymer is entrapped within and highly dispersed throughout a network of inorganic oxide, said network having a plurality of metal oxy species bonded thereto, said metal oxy species being selected from the group consisting of: a metal oxy halide, an alkyl metal oxy halide, and an alkyl metal oxy.

DETAILED DESCRIPTION OF THE INVENTION

It is well known in the literature that Lewis acids catalyze a range of reactions, for example alkylations, acylations, esterifications, and isomerizations. Imparting Lewis acid character to a known porous microcomposite yields herein novel catalysts which can possess improved activity in these types of reactions. While not intending to be bound by any mechanism, it is believed that key features of the present invention include the modification of a plurality of the residual hydroxyl groups of the inorganic oxide network to metal oxy species, and optional modification of all or a portion of the pendant sulfonic acid groups of a perfluorinated ion-exchange polymer of a porous microcomposite to metal sulfonate groups, alkyl metal sulfonate groups, metal halide sulfonate groups, alkyl metal halide sulfonate groups, sulfonic acid/Lewis acid complex groups, or any combination of said groups.

The present invention concerns the modification of a porous microcomposite. By "porous microcomposite" is meant a composition comprising a perfluorinated ion-exchange polymer (PFIEP) containing pendant sulfonic acid groups, wherein said polymer is entrapped within and highly dispersed throughout a network of inorganic oxide. The PFIEP may optionally further comprise pendant carboxylic acid groups. The percentage of the perfluorinated ion-exchange polymer in the microcomposite is from 0.1 to about 90% by weight and the size of the pores in the microcomposite is about 1 nm to about 75 nm, and the microcomposite optionally further comprises pores having a size in the range of about 75 nm to about 1000 nm. Such microcomposites are described in U.S. application Ser. No. 08/574,751, filed Dec. 19, 1995 incorporated by reference herein and in the corresponding PCT publication WO 95/19222. The microcomposite can be in any size or shape to be utilized in the present invention, such as ground into particles or shaped into spheres. The PFIEP is, preferably, a sulfonated NAFION® PFIEP. The weight percentage of PFIEP preferably ranges from about 5% to about 80%, most preferably from about 10% to about 15%. The inorganic oxide of the network is preferably silica, alumina, titania, germania, zirconia, alumino-silicate, zirconyl-silicate, chromic oxide, iron oxide, or mixture thereof; most preferably silica.

The inorganic oxide network of the present modified porous microcomposite has a plurality of metal oxy species bonded thereto. By "having a plurality of metal oxy species bonded thereto" is meant that a portion of the hydroxyl groups of the inorganic oxide network of the porous microcomposite, preferably at least 50% of the hydroxyl groups, most preferably at least 80% of the hydroxyl groups, are converted to a metal oxy species via reaction with a Lewis acid, and this metal oxy species remains bonded to the inorganic oxide network of the modified porous microcomposite.

As is known after formation of an inorganic oxide network, there are numerous residual hydroxyl groups. This is because during network formation each of the inorganic atoms become constituents of a network structure via bonds to other inorganic atoms through oxygen but condensation to form these crosslinks does not go to 100% completion; there are residual, uncrosslinked hydroxyl groups. For example, in the present case where the inorganic oxide of the network is silica, silanol (Si—OH) groups can be found as part of the network, and it is a plurality of the hydroxyl (—OH) groups of these silanols that are converted to metal oxy species which remain bonded to the network.

By "metal oxy species" is meant a group selected from the group consisting of: a metal oxy halide group, an alkyl metal oxy halide group, and an alkyl metal oxy group. A metal oxy species can be represented by the formula - $MR_qX_{n-1}$, wherein, M is a metal from a Lewis acid, R is a monovalent hydrocarbon radical, X is a halide selected from the group consisting of: Cl, Br and F; q is an integer ranging from 0 up to an integral value such at q+n is equal to the oxidation state of M; and n is an integer ranging from 1 up to an integral value such that q+n is equal to the oxidation state of M. Thus, the particular kind of metal oxy species that is bonded to the inorganic oxide network depends on the values of q and n-1. For example, when q=0, a metal oxy halide species results; when n-1=0, an alkyl metal oxy species results, and when both q and n-1 are greater than 0, an alkyl metal oxy halide results. Representative examples of metal oxy species are —$OAlCl_2$, —$OBCl_2$, —$OAl(CH_3)Cl$, —$OAl(CH_2CH_3)Cl$, —$OAl(CH_2CH_3)_2$, —$OZnCl$, —$OTiCl_3$, and —$OSnCl_3$.

As is shown below, when a Lewis acid, which can be of the formula $MR_qX$, wherein M, R and X are as defined above, reacts with the hydroxyl group of the inorganic oxide network of the porous microcomposite, the metal oxy species is formed and is bonded to the network. This process is described in more detail below.

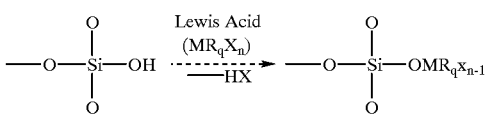

HX or HR is a byproduct of the reaction. For example, the Lewis acid, $CH_3CH_2AlCl_2$, will give the metal oxy species —$OAlCl_2$ and the byproduct $CH_2CH_2$—H.

The pendant groups of the PFIEP of the modified porous microcomposite can be sulfonic acid groups, metal sulfonate groups, alkyl metal sulfonate groups, metal halide sulfonate groups, alkyl metal halide sulfonate groups, sulfonic acid/Lewis acid complex groups, or any combination of said groups. Optionally, the PFIEP of the modified porous microcomposite may further comprise carboxylic acid groups, metal carboxylate groups, alkyl metal carboxylate groups, metal halide carboxylate groups, alkyl metal halide carboxylate groups, carboxylic acid/Lewis acid complex groups, or any combination of said groups. Depending on the nature of the pendant groups of the PFIEP, the modified porous microcomposite can be Lewis acid and/or Bronsted acid in character. Included within the definition of "pendant" are those embodiments wherein two or more pendant groups are bridged to each other through a metal halide group, an alkyl metal halide group or a metal alkyl group. For example, PFIEP within a modified porous microcomposite could have the following structure: $R_f$—$SO_3$—$TiCl_2$—$SO_3$—$R_f$. Other representative bridging configurations are: $R_f$—$SO_3$—$Al(Cl)$—$SO_3$—$R_f$, $R_f$—$SO_3$—$Al(CH_2CH_3)$—$SO_3$—$R_f$; $R_f$—$SO_3$—$Ti(Cl)(CH_2CH_3)$—$SO_3$—$R_f$, and $R_f$—$SO_3$—$Zr(Cl)_2$—$SO_3$—$R_f$.

The sulfonic acid groups are of the formula —$SO_3H$. The metal sulfonate groups, alkyl metal sulfonate groups, metal halide sulfonate groups and alkyl metal halide sulfonate groups can be of the formula

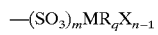

wherein:

M is a metal selected from the group consisting of: Al, B, Ti, Fe, Zn, Ga, Sn, Sb, Zr, Ta, Sc, Yb, Rh, Pd and La, preferably Al, B, Ti, and Sn;

R is a monovalent hydrocarbon radical, preferably $C_1$ to $C_{12}$ alkyl or aryl;

X is a halide selected from the group consisting of: Cl, Br and F;

q is an integer ranging from 0 up to an integral value such that q+m+n-1 is equal to the oxidation state of M;

m is an integer ranging from 1 up to the oxidation state of M; and n−1 is an integer ranging from 0 up to an integral value such that q+m+n−1 is equal to the oxidation state of M. Thus, the particular kind of pendant metal sulfonate group of the PFIEP of the modified porous microcomposite represented by the formula above depends on the values of q and n−1. For example, when q=0 and n−1=0, the pendant group is a metal sulfonate group; when n−1=0, the pendant group is an alkyl metal sultonate group; when q=0 and n−1 is greater than 0, the pendant group is a metal halide sulfonate group; and when both q and n−1 are greater than 0, the pendant group is an alkyl metal halide sulfonate group. Representative examples of metal sulfonate groups are —$SO_3AlCl_2$, —$(SO_3)_2AlCl$, —$(SO_3)_3Al$, —$SO_3TiCl_3$, —$(SO_3)_2TiCl_2$, —$(SO_3)_3TiCl$, —$(SO_3)_4Ti$, —$SO_3BCl_2$, —$(SO_3)_2BCl$, —$(SO_3)_3B$, —$(SO_3)_3Sc$, and —$(SO_3)_3Yb$, —$(SO_3)_2Al(CH_2CH_3)$, and —$(SO_3)_2Ti(Cl)(CH_2CH_3)$.

The sulfonic acid/Lewis acid complex groups are "superacid" groups which can be of the formula —$(SO_3)_m$·$MR_qX_n$ Representative examples of sulfonic acid/Lewis acid complex groups are —$(SO_3)HF·BF_3$ and —$(SO_3)H·SbF_5$.

Preferably, the PFIEP of the modified porous microcomposite contains sulfonic acid groups and metal halide sulfonate groups. Most preferably PFIEP with these groups are about 10 to about 25% by weight of the modified microcomposite.

This invention further provides a process for the preparation of said modified porous microcomposite comprising contacting a porous microcomposite, as defined above, with an effective amount of a Lewis acid for a time sufficient to convert a plurality of hydroxyl groups of the inorganic oxide network to metal oxy species. Preferably, the Lewis acid is a compound of the formula $MR_qX_n$ wherein:

M is a metal selected from the group consisting of: Al, B, Ti, Fe, Zn, Ga, Sn, Sb,
Zr, Ta, Sc, Yb, Rh, Pd and La, preferably Al, B, Ti or Sn.

R is a monovalent hydrocarbon radical, preferably a $C_1$ to $C_{12}$ alkyl or aryl;

X is a halide selected from the group consisting of: Cl, Br and F;

q is an integer ranging from 0 up to an integral value such that q+n is equal to the oxidation state of M;

n is an integer ranging from 0 up to an integral value such that q+n is equal to the oxidation state of M.

Representative examples of Lewis acids are $AlCl_3$, $TiCl_4$, $BCl_3$, $ZrCl_4$, $ZnCl_2$, $Zn(C_2H_5)_2$, and $Al(CH_2CH_3)Cl_2$. A preferred Lewis acid is $AlCl_3$.

Contact of the porous microcomposite with the Lewis acid can be accomplished in a number of ways, for example, in a gas phase, in a liquid phase or via sublimation, depending on the Lewis acid selected.

In the gas phase, the porous microcomposite can be placed in a glass tube in flowing dry nitrogen, with optional heat (just above room temperature to about 200° C.). and allowed to react in this gas phase with a Lewis acid, for example aluminum chloride, ethylaluminumchloride, or $TiCl_4$. The resulting vapors pass over the microcomposite at a temperature ranging from about room temperature to about 280° C. for a time sufficient to convert a plurality of the hydroxyl groups of the inorganic oxide network to metal oxy species. During the present process, the pendant sulfonic acid groups of the PFIEP can remain unchanged or all or a portion of said pendant sulfonic acid groups can be converted to metal sulfonate groups, alkyl metal sulfonate groups, metal halide sulfonate groups, alkyl metal halide sulfonate groups, sulfonic acid/Lewis acid complex groups, or any combination of said groups. After completion of the reaction, Lewis acid and any byproducts of the reaction can be removed by heating the product in vacuum.

In a liquid phase embodiment, a porous microcomposite which has been dried can be reacted with a Lewis acid dissolved in a solvent. Representative examples of dissolved Lewis acids are $AlCl_3$ dissolved in nitromethane, $EtAlCl_2$ dissolved in hexane, $BCl_3$ dissolved in heptane, and the like. Mixtures of alkylchlorotitanium compounds or mixtures of alkylchloroboron compounds are also suitable Lewis acids. The process can be conducted at reflux temperature, the product filtered and washed with a solvent. Suitable solvents include, but are not limited to, alkanes, nitromethane or ether.

The modified porous microcomposite of the present invention can also be prepared using sublimation. For example, sublimation of $AlCl_3$ at a temperature ranging from about room temperature to about 200° C. in vacuum in the presence of the porous microcomposite will yield a modified porous microcomposite having a metal oxy species bonded to the inorganic oxide network. Depending on process conditions, the pendant groups of the PFIEP of the resulting modified porous microcomposite could be selected from: sulfonic acid groups, aluminum sulfonate groups, aluminum chloride sulfonate groups, or any combination of said groups. Any excess $AlCl_3$ can be removed by applying vacuum to the modified microcomposite, optionally with heat.

In cases where the microcomposite is contacted with a Lewis acid which is an alkyl metal compound, such as triethylaluminum ($Et_3Al$) or trimethylboron ($Me_3B$), to form a modified microcomposite having pendant alkyl metal sulfonate groups, the process may further comprise contacting the modified microcomposite with a source of halogen. Preferably the halogen source comprises chloride or alkyl chloride, such as tert butyl chloride. By contacting the modified microcomposite with a source of halogen, a new modified porous microcomposite is generated which can have pendant metal halide sulfonate groups (and pendant alkyl metal halide sulfonate groups), such as aluminum chloride, in addition to, or in lieu of the pendant alkyl metal sulfonate groups. In this embodiment, the microcomposite can be reacted either in the gas phase, as described above, or in a liquid phase using the alkyl metal compound in a suitable solvent, such as hexane. The modified microcomposite can be dried in vacuum and is preferably kept free from moisture by storing it in an inert atmosphere.

It is preferred that the porous microcomposite, as defined above, be dry prior to contact with the Lewis acid and that the present process be carried out under essentially anhydrous conditions.

In the process of the present invention, the conditions can be varied to alter the extent of halide or hydrocarbon radical, R, loss. For example, with a large excess of Lewis acid, such as $ZrCl_4$, zinc chloro sulfonate groups can be obtained as pendant groups of the PFIEP. However, with an excess of the sulfonate within the microcomposite, all of the halide groups of the Lewis acid may combine with the hydrogen from the pendant sulfonic acid groups of the PFIEP of the porous microcomposite wherein the pendant groups of the PFIEP of the resulting modified porous microcomposite can be of the metal sulfonate type, —$(SO_3)_4Zr$.

In an embodiment of this invention, the porous microcomposites can be modified with certain Lewis acids to give solid acids with greatly increased acid strength, i.e. superacids. Boron trifluoride is an example of such a Lewis acid. The porous microcomposite can be reacted with $BF_3$ in the gas phase to functionalize the sulfonic acid resulting in a pendant sulfonic acid/Lewis acid complex group, —$SO_3H^+ \cdot BF_3$. The porous microcomposite can be treated either in the gas phase or in the liquid phase, optionally with a solvent present, to yield a series of adducts which have high acid strength. Other Lewis acids usable in this embodiment of the invention include, but are not limited to, $SbF_5$ and $TaF_5$. When $SbF_5$ is employed, functional groups of the kind —$SO_3 \cdot SbF_5$ are the result.

The present invention also provides a process for the preparation of the modified porous microcomposite described above, comprising the steps of: contacting a metal oxide with an aqueous solution comprising a perfluorinated ion-exchange polymer containing pendant sulfonic acid groups to form a polymer/metal ion solution; adding to the polymer/metal ion solution a hydrolyzed inorganic oxide; allowing network formation of the inorganic oxide to occur; and recovering the modified porous microcomposite. It is believed this process of preparing the modified porous microcomposite can promote crosslinking resulting in bridged pendant groups. In this process a metal oxide, preferably an acid-soluble metal oxide, such as certain transition metals or lanthandies, for example, scandium oxide or ytterbium oxide, is contacted with an aqueous solution comprising a perfluorinated ion-exchange polymer containing pendant sulfonic acid groups. Such aqueous solutions of PFIEP are available from Aldrich Chemical Co., Milwaukee, Wis., or PFIEP solutions generally can be prepared using the procedure of U.S. Pat. No. 5,094,995 and U.S. Pat. No. 4,433,082, incorporated by reference herein. The process may further comprise the step of heating the aqueous polymer solution and the metal oxide to enable the metal oxide to dissolve. To the resulting polymer/metal ion solution is added a hydrolyzed inorganic oxide. Such inorganic oxide compounds can be the same as those described above and can be hydrolyzed by conventional methods. Network formation of the inorganic oxide is allowed to occur. Gelation may in some instances self-initiate or in others can be facilitated by adjusting the pH with acid or base, such as NaOH. The modified microcomposilte can be dried and subsequently washed with deionized water. The dried microcomposite can be optionally washed with various degrees of an acid, such as nitric acid.

The utility of the modified porous microcomposites of the present invention is in catalyst compositions including use, for example, in alkane isomerization or petroleum cracking processes. The modified porous microcomposite of the present invention can also be used in catalyst compositions for alkylations, acylations, esterifications, or isomerizations.

Thus, the present invention provides an improved method for alkylating an aromatic compound, the improvement comprising using an effective amount of a catalyst composition comprising the modified porous microcomposite described above.

EXAMPLES

A 13 wt % NAFION® resin in silica microcomposite catalyst, referred to in the examples below as the unmodified microcomposite, was prepared as described in the next paragraph using a NAFION® PFIEP NR 005 solution. NAFION® PFIEP NR 005 solution is available from DuPont NAFION® Products, Fayetteville, N.C., is also known as NAFION® SE-5110, and is prepared from resin which is approximately 6.3 tetrafluoroethylene molecules for every perfluoro(3,6-dioxa-4-methyl-7-octenesulfonyl fluoride) molecule ($CF_2$=CF—O—($CF_2$ $_{CF(CF3)}$)—O—$CF_2CF_2$—$SO_2F$). After hydrolysis of the resin, the PFIEP has an equivalent weight of approximately 1070., NAFION® PFIEP solutions can be purchased from Aldrich Chemical Co., Milwaukee, Wis., or PFIEP solutions generally can be prepared using the procedure of U.S. Pat. No. 5,094,995 and U.S. Pat. No. 4,433,082.

204 g of tetramethoxysilane (TMOS), 33 g of distilled water and 3 g of 0.04 M HCl was stirred for 45 min to give a clear solution. To 300 mL of a NAFION® PFIEP solution was added 150 mL of a 0.4 M NaOH solution, while the PFIEP solution was being stirred. After addition of the NaOH solution, the resulting solution was stirred for a further 15 min. The TMOS solution was added rapidly to the stirred PFIEP solution. After about 10–15 sec, the solution gelled to a solid mass. The gel was placed in an oven and dried at a temperature of about 95° C. over a period of about 2 days followed by drying under vacuum overnight. The hard, glass-like product was ground and passed through a 10-mesh screen. The material was then stirred with 3.5M HCl for 1 hour (with 500 mL of acid), followed by washing with 500 mL deionized water. The solid was collected by filtration. Acidification, washing and filtration were repeated a total of 5 times and after the final wash the solid was dried under vacuum at 100° C. for 24 hours.

Example 1

Treatment of a Porous Microcomposite with Aluminum Chloride in the Gas Phase 5 g of an unmodified microcomposite (as prepared above) was placed in a vertical tube (held in place by glass wool), and 5 g of $AlCl_3$ was placed about 4–6 cm beneath the $AlCl_3$. The tube and contents were heated to 175° C. with a slow stream of nitrogen passing through the tube for 4 hours. The product (5.3 g) was removed following reaction, and Al and Cl were shown to be present using chemical analysis.

Example 2

Treatment of a Porous Microcomposite with Aluminum Chloride via Sublimation 5g of an unmodified microcomposite (as prepared above) was reacted via sublimation of the $AlCl_3$ at 125° C. in vacuum by placing the $AlCl_3$ (5g) in the bottom of a glass tube over which a layer of glass wool was placed and on top of that the microcomposite was placed. The tube and contents were heated under vacuum at 125° C. for 8 hrs and the aluminum modified microcomposite was removed from the tube under a nitrogen atmosphere. The Al content was 1.7 wt %.

Example 3

Treatment of a Porous Microcomposite with Aluminum Chloride in the Gas Phase 5 g of an unmodified microcomposite (as prepared above) was placed in a vertical tube (held in place by glass wool), and 10 g of $AlCl_3$ was placed about 4–6 cm beneath the $AlCl_3$. The tube and contents were heated to 200° C. with a slow stream of nitrogen passing through the tube for 9 hours. The product (5.15 g) was removed following reaction, and Al and Cl were shown to be present using chemical analysis.

Example 4

Treatment of a Porous Microcomposite with Aluminum Chloride in the Gas Phase 5 g of an unmodified microcomposite (as prepared above) was placed in a vertical tube (held in place by glass wool), and 10 g of AlCl$_3$ was placed about 4–6 cm beneath the AlCl$_3$. The tube and contents were heated to 170° C. with a slow stream of nitrogen passing through the tube for 4 hours. The product (5.3 g) was removed following reaction, and Al and Cl were shown to be present using chemical analysis.

Example 5

Treatment of a Porous Microcomposite with Aluminum Chloride in the Liquid Phase 5 g of AlCl$_3$ was added to 100 ml of freshly distilled CCl$_4$ and to this was added 5 g of an unmodified dried microcomposite (as prepared above). The mixture was stirred for 6 hours under reflux under a stream of dry nitrogen. The solid product was filtered, washed with excess CCl$_4$ and dried in vacuum. Moisture was excluded by working under an inert atmosphere.

Example 6

Treatment of a Porous Microcomposite with Triethylaluminum 5 g of an unmodified microcomposite (as prepared above) was reacted with 20g of triethylaluminum (1M in hexane) and left to react for 24 hr at room temperature. Upon contact of the microcomposite with the triethylaluminum, the flask and contents got warm with the temperature rising to 40° C. The solid product was filtered in dry nitrogen, washed with dry hexane and then dried in vacuum.

Example 7

Treatment of a Porous Microcomposite with TiCl$_4$ 30 g of TiCl$_4$ was cooled using a carbon dioxide/acetone bath (–78° C.) and then was added to 5 g of dried microcomposite. This was left to warm overnight to room temperature and the excess TiCl$_4$ was removed under vacuum to yield the titanium chloride modified material. The percent of Ti found in the modified microcomposite was 1.77.

Example 8

Treatment of a Porous Microcomposite with BCl$_3$ 20 g of BCl$_3$ in hexane (Aldrich) was cooled using a carbon dioxide/acetone bath (–78° C.) and then was added to 5 g of dried microcomposite. This was left to warm overnight to room temperature, and the excess BCl$_3$ was removed under vacuum to yield the titanium chloride modified material. The percent of B found in the modified microcomposite was 0.4.

Example 9

Treatment of a Porous Microcomposite with Al(C$_2$H$_5$)Cl$_2$ 20 g of Al(C$_2$H$_5$)Cl$_2$ in hexane (Aldrich ) was cooled using a carbon dioxide/acetone bath (–78C) and then was added to 10 g of dried composite. This was left to warm overnight to room temperature and the excess Al(C$_2$H$_5$)Cl$_2$ was removed under vacuum to yield the titanium chloride modified material. The percent of Al found in the modified microcomposite was 1.78.

Example 10

Benzene Pronylation Catalyzed by Solid Acid Catalysts

Four samples of an Al$_2$O$_3$ modified microcomposite and one sample of an unmodified microcomposite (as prepared above) were tested as solid acid catalysts in a benzene propylation to cumene. The alkylation reaction was carried out in the liquid phase under ambient pressure at 70° C. by bubbling propylene through the neat benzene solution containing the solid acid catalyst. The benzene solution was presaturated with propylene at the reaction temperature and then the catalyst was added. For each run 1 g of the solid acid catalyst was added to a flask containing 50 g of benzene. Liquid samples were taken at certain time intervals and analyzed by gas chromatography. Table 1 lists the reaction rate and benzene conversion to cumene after 1 hr at 70° C. over the five catalysts.

TABLE 1

| Catalyst | Reaction Rate (mM/gcat.gr) | Cumene Yield (%) |
| --- | --- | --- |
| Unmodified Microcomposite | 30.0 | 3.8 |
| Modified Microcomposite of Example 1 | 148.0 | 8.5 |
| Modified Microcomposite of Example 2 | 548.0 | 34.8 |
| Modified Microcomposite of Example 3 | 99.2 | 5.0 |
| Modified Microcomposite of Example 4 | 94.3 | 6.4 |

Example 11

Synthesis of Scandium Modified Microcomposites 0.1 g of scandium oxide was added to a NAFION® solution (10 wt %) in water. The solution and oxide was heated to 100° C. for 1 hour at which point the oxide dissolved. To this solution was added a solution of tetramethoxysilane which had been hydrolyzed by mixing 40 g of tetramethoxysilane, 6 g of water and 0.6 g of 0.04M HCl and stirring stirred for one hour. To this was added 12 mls of 0.4M NaOH and the system gelled. The gel was dried in a steam of nitrogen at 90° C., and the dried gel was washed with 5 liters of deionized water.

What is claimed is:

1. In a method of alkylating an aromatic compound, the improvement comprising using an effective amount of a catalyst composition comprising a modified porous microcomposite catalyst comprising a perfluorinated ion-exchange polymer containing pendant groups selected from the group consisting of: sulfonic acid groups, metal sulfonate groups, alkyl metal sulfonate groups, metal halide sulfonate groups, alkyl metal halide sulfonate groups, sulfonic acid/Lewis acid complex groups, and any combination of said groups, wherein the polymer is entrapped within and highly dispersed throughout a network of inorganic oxide, said network having a plurality of metal oxy species bonded thereto, said metal oxy species being selected from the group consisting of a metal oxy halide, an alkyl metal oxy halide, and an alkyl metal oxy.

2. The method of claim 1 wherein the perfluorinated ion-exchange polymer contains sulfonic acid groups and metal halide sulfonate groups and is about 10 to about 25% by weight of the microcomposite.

3. The method of claim 1 wherein the inorganic oxide of the network is silica and the metal oxy species is aluminum chloride.

* * * * *